United States Patent
Guo et al.

(10) Patent No.: US 9,577,569 B2
(45) Date of Patent: Feb. 21, 2017

(54) MOTOR CONTROL SYSTEM OF ELECTRIC VEHICLE AND CONTROLLING METHOD FOR MOTOR CONTROL SYSTEM OF ELECTRIC VEHICLE AND ELECTRIC VEHICLE

(71) Applicant: BYD COMPANY LIMITED, Shenzhen (CN)

(72) Inventors: Caifang Guo, Shenzhen (CN); Bingjian Huang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 0 days.

(21) Appl. No.: 14/900,041

(22) PCT Filed: Jul. 8, 2014

(86) PCT No.: PCT/CN2014/081836
§ 371 (c)(1),
(2) Date: Dec. 18, 2015

(87) PCT Pub. No.: WO2015/003619
PCT Pub. Date: Jan. 15, 2015

(65) Prior Publication Data
US 2016/0149534 A1    May 26, 2016

(30) Foreign Application Priority Data
Jul. 9, 2013   (CN) .......................... 2013 1 0286916

(51) Int. Cl.
G05B 5/00    (2006.01)
H02P 29/02   (2016.01)
(Continued)

(52) U.S. Cl.
CPC ............. *H02P 29/028* (2013.01); *B60L 3/003* (2013.01); *B60L 3/0084* (2013.01); *B60L 3/0092* (2013.01);
(Continued)

(58) Field of Classification Search
CPC ... B60R 16/033; B62D 5/0481; B62D 5/0484; B62D 6/08; H02J 1/00
See application file for complete search history.

(56) References Cited

U.S. PATENT DOCUMENTS 5,304,912 A    4/1994  Kajiwara et al.
6,107,762 A    8/2000  Schauer
(Continued)

FOREIGN PATENT DOCUMENTS

CN    201559539 U    8/2010
CN    101943900 A    1/2011
(Continued)

OTHER PUBLICATIONS

International Search Report and Written Opinion of the International Searching Authority for Application No. PCT/CN2014/081836, dated Sep. 29, 2014.
(Continued)

*Primary Examiner* — Shawki S Ismail
*Assistant Examiner* — Zoheb Imtiaz
(74) *Attorney, Agent, or Firm* — Alston & Bird LLP

(57) ABSTRACT

A motor control system of an electric vehicle, a controlling method for the motor control system and an electric vehicle are provided. The motor control system includes: an IGBT module, connected with a motor of the electric vehicle; a detection module, configured to detect a motor speed; a drive module, configured to drive IGBTs in the IGBT module to turn on or off so as to control the motor to work or stop working; a first control module; a second control
(Continued)

module communicated with the first control module; and a channel selection module, configured to select a channel of the second control module when the first control module has a fault. When the second control module is selected, it sends a second control signal to the drive module according to the motor speed at a predetermined time before the first control module has the fault, so as to control the motor to stop working.

8 Claims, 7 Drawing Sheets

(51) Int. Cl.
*H02P 27/08* (2006.01)
*B60L 3/00* (2006.01)
*B60L 15/00* (2006.01)

(52) U.S. Cl.
CPC ........... *B60L 15/007* (2013.01); *H02P 27/085* (2013.01); *H02P 29/032* (2016.02); *B60L 2240/421* (2013.01); *B60L 2240/525* (2013.01); *B60L 2240/529* (2013.01); *B60L 2240/80* (2013.01); *Y02T 10/644* (2013.01); *Y02T 10/645* (2013.01); *Y02T 10/7258* (2013.01); *Y02T 90/16* (2013.01)

(56) References Cited

U.S. PATENT DOCUMENTS

| 2005/0225173 | A1 | 10/2005 | Woltereck et al. |
| 2011/0018578 | A1* | 1/2011 | Bae .................. G01R 31/42 |
| | | | 324/764.01 |
| 2011/0133549 | A1 | 6/2011 | Song |
| 2013/0082762 | A1 | 4/2013 | Gan et al. |
| 2013/0090813 | A1* | 4/2013 | Kanekawa ........... B62D 5/0481 |
| | | | 701/43 |
| 2014/0203848 | A1* | 7/2014 | Miyachi ............... H03K 17/107 |
| | | | 327/109 |

FOREIGN PATENT DOCUMENTS

| CN | 102082563 A | 6/2011 |
| CN | 201901171 U | 7/2011 |
| CN | 202085120 U | 12/2011 |
| CN | 202424619 U | 9/2012 |
| CN | 103078579 A | 5/2013 |
| CN | 202940764 U | 5/2013 |
| JP | S60 102878 A | 6/1985 |
| JP | H06 261585 A | 9/1994 |
| JP | 2006074951 A | 3/2006 |

OTHER PUBLICATIONS

Supplementary European Search Report for European Application No. EP 14 82 2105 dated Jun. 3, 2016.

* cited by examiner

MOTOR CONTROL SYSTEM OF ELECTRIC VEHICLE AND CONTROLLING METHOD FOR MOTOR CONTROL SYSTEM OF ELECTRIC VEHICLE AND ELECTRIC VEHICLE

CROSS-REFERENCE TO RELATED APPLICATIONS

The present application is a U.S. National Stage of International Application No. PCT/CN2014/081836, filed Jul. 8, 2014, entitled "MOTOR CONTROL SYSTEM OF ELECTRIC VEHICLE AND CONTROLLING METHOD FOR MOTOR CONTROL SYSTEM OF ELECTRIC VEHICLE AND ELECTRIC VEHICLE," which claims priority to and the benefit of Chinese Patent Application Serial No. 201310286916.3, filed with the State Intellectual Property Office of P.R. China on Jul. 9, 2013, the content each of which is incorporated herein by reference in its entirety.

FIELD

The present disclosure relates to an electric vehicle technology, and in particular, relates to a motor control system of the electric vehicle and a controlling method for the motor control system of the electric vehicle and the electric vehicle.

BACKGROUND

A drive motor controller of an electric vehicle mainly includes a power supply module, a minimum module, a rotary transformer circuit, a drive module, a power module, an IPM (intelligent power module), a sampling module and an input/output switch module etc. The power supply module can provide voltage to each module of the controller for working normally. For example, the minimum module is provided with 3.3V, 1.9V or 5V voltage to work normally, the rotary transformer circuit is provided with +5V or ±15V voltage to work normally, the drive modules is provided with +15V, −8V or +5V voltage to work normally, the power module is provided with 460V high-voltage to work normally, the intelligent power module is provided with +12V or +5V voltage to work normally, the sampling module is provided with +5V, +3.3V, +3.3VA, +5V or +12V voltage to work normally, the input/output switch module is provided with +5V, +3.3V or +12V voltage to work normally. The minimum module mainly includes a DSP (Digital Signal Processor), a flash memory, a watchdog, an EEPROM (Electrically Erasable Programmable Read-Only Memory), a crystal oscillator, a burning mouth, etc. The rotary transformer circuit is configured to sample a current position of a motor rotor in real-time. The PWM (Pulse Width Modulation) wave output from the DSP is transferred to the drive chip after level conversion, filtering and phase inversion, so as to drive the power module. The power module (i.e., IGBT (Insulated Gate Bipolar Transistor) module) is a power component of the controller, and the motor is controlled to work or to stop working by controlling IGBTs in the power module to turn on or off. The IPM is used to realize an over-temperature protection and an over-current protection of the IGBT module, and can latch a fault signal and send the fault signal to the DSP. The sampling module is mainly used to realize a throttle sampling, a brake sampling, a motor temperature sampling, a radiator temperature sampling, a high voltage sampling, a battery voltage sampling, a three-phase current sampling, a humidity sampling and a body inclination angle sampling, etc. The input/output switch module includes a handbrake sampling, a footbrake sampling, a high voltage interlock sampling, a power-off protection and a collision signal sampling, etc.

In the related art, the drive motor controller generally works as follows: when a crash signal of the DSP is detected, the controller directly turns off all the PWM waves of the drive signal, so as to turn off all the IGBTs in the power module, regardless of a motor speed (a driving speed of a vehicle). In this case, a counter electromotive force of the motor is higher than a voltage across a battery, and thus the energy of the motor at a high rotating speed (represented as the counter electromotive force of the motor) can be charged to the battery instantaneously via a uncontrollable rectifier of the drive motor controller. The uncontrollable rectifier instantaneously charges the battery and a bus capacitor, and due to a large current of the uncontrollable rectifier, the battery and the bus capacitor may be damaged. Moreover, since the counter electromotive force of the motor is too large, the drive components and the power components of the drive motor controller may be damaged. Furthermore, since the motor has a great feedback torque, an uncontrollable and large braking force is generated, which results in that the motor shakes intensely and makes the vehicle in an uncontrollable state.

The existing technology has following disadvantages. When the DSP is in a crash state, the PWM wave of the drive signal sent out from the drive motor controller is in an unknown state, and if the vehicle is now in a high-speed driving state, the vehicle may have an intense back and forth shaking and get out of control, and even the drive components or the power components may be damaged.

SUMMARY

The purpose of the present disclosure is to solve at least one of the problems existing in the prior art to at least some extent.

Therefore, a first object of the present disclosure is to provide a motor control system of an electric vehicle, which can convert an uncontrollable failure due to the vehicle fault during a high speed driving into a controllable failure, and avoid the case that the vehicle has an intense back and forth shaking caused by the uncontrollable failure of the vehicle, and ensure that the vehicle stops more smoothly, securely and reliably from the high-speed driving state.

A second object of the present disclosure is to provide a controlling method for the motor control system of the electric vehicle.

A third object of the present disclosure is to provide the electric vehicle.

According to embodiments of a first aspect of the present disclosure, the motor control system of the electric vehicle is provided. The motor control system of the electric vehicle includes: an IGBT module, connected with a motor of the electric vehicle; a detection module, connected with the motor, and configured to detect a motor speed; a drive module, connected with the IGBT module, and configured to drive IGBTs in the IGBT module to turn on or off so as to control the motor to work or stop working; a first control module connected with the detection module; a second control module communicated with the first control module; and a channel selection module, connected with the drive module, the first control module and the second control module respectively, and configured to select a channel of the first control module or the second control module, in which when the first control module has a fault, the channel selection module selects the channel of the second control module; when the channel selection module selects the channel of the first control module, and to the second control module sends a first control signal to the drive module so as to control the drive module to drive the IGBTs in the IGBT module to turn on or off; and when the channel selection module selects the channel of the second control module, to the second control module sends a second control signal to the drive module according to the motor speed at a predetermined time before the first control module has the fault, so as to control the motor to stop working.

According to embodiments of a second aspect of the present disclosure, another motor control system of the electric vehicle is provided. The motor control system of the electric vehicle includes: an IGBT module, connected with a motor of the electric vehicle; a detection module, connected with the motor, and configured to detect a motor speed; a drive module, connected with the IGBT module, and configured to drive IGBTs in the IGBT module to turn on or off so as to control the motor to work or stop working; a first control module connected with the detection module; a second control module connected with the detection module and communicated with the first control module; and a channel selection module, connected with the drive module, the first control module and the second control module respectively, and configured to select a channel of the first control module or the second control module; in which when the first control module has a fault, the channel selection module selects the channel of the second control module; when the channel selection module selects the first control module, the first control module sends a first control signal to the drive module, so as to control the motor to work or stop working; and when the channel selection module selects the channel of the second control module, the second control module sends a second control signal to the drive module according to the current motor speed, so as to control the motor to stop working.

With the motor control system of the electric vehicle according to embodiments of the present disclosure, when the first control module has the fault, the channel selection module selects the channel of the second control module, and then the second control module sends the second control signal according to the motor speed to control the motor to stop working, which can convert an uncontrollable failure (for example, turning off waves instantaneously) due to the vehicle fault (for example, a crash fault of a DSP, an error of a rotary transformer, an IGBT temperature protection, a motor temperature protection) during a high speed driving into controllable failure (for example, making the current fully consumed by the motor itself, ensuring that a feedback current is a fixed value within an acceptable range, a feedback torque is small and a braking force is controlled within a few Newton meters), thus ensuring that the vehicle stops more smoothly, securely and reliably from the high-speed driving state, and avoiding that the vehicle has an intense forth and back shaking and power components of the vehicle are damaged.

According to embodiments of a third aspect of the present disclosure, an electric vehicle is provided. The electric vehicle includes the motor control system as described in the first aspect or the second aspect of the present disclosure.

With the electric vehicle according to embodiments of the present disclosure, when the first control module has the fault, the channel selection module selects the channel of the second control module, and then the second control module sends the second control signal according to the motor speed to control the motor to stop working, which can convert an uncontrollable failure due to the vehicle fault during a high speed driving into controllable failure, thus ensuring that the vehicle stops more smoothly, securely and reliably from the high-speed driving state, and avoiding that the vehicle has an intense forth and back shaking and power components of the vehicle are damaged.

According to embodiments of a fourth aspect of the present disclosure, a controlling method for the motor control system of the electric vehicle is provided. The motor control system includes an IGBT module, a detection module connected with a motor of the electric vehicle, a drive module connected with the IGBT module, a channel selection module connected with the drive module, a first control module connected with the detection module and the channel selection module respectively, and a second control module connected with the channel selection module and communicated with the first control module. The controlling method for the motor control system of the electric vehicle includes: detecting a motor speed by the detection module and sending the motor speed to the first control module; determining whether the first control module has a fault; when the first control module does not have a fault, selecting a channel of the first control module by the channel selection module, and sending a first control signal by the first control module to control the drive module to drive IGBTs in the IGBT module to turn on or off so as control the motor to work or stop working; when the first control module has a fault, selecting a channel of the second control module by the channel selection module, and sending a second control signal by the second control module to the drive module according to the motor speed at a predetermined time before the first control module has the fault, so as to control the motor to stop working.

According to embodiments of a fifth aspect of the present disclosure, a controlling method for the motor control system of the electric vehicle is provided. The motor control system includes an IGBT module, a detection module connected with a motor of the electric vehicle, a drive module connected with the IGBT module, a channel selection module connected with the drive module, the first control module connected with the detection module and the channel selection module respectively, and a second control module connected with the detection module and the channel selection module respectively and communicated with the first control module. The controlling method includes: detecting a motor speed by the detection module and sending to the motor speed to the first control module and the second control module; determining whether the first control module has a fault; when the first control system does not have a fault, selecting a channel of the first control module by the channel selection module, and sending a first control signal by the first control module to control the drive module to drive IGBTs in the IGBT module to turn on or off so as to control the motor to work or stop working; when the first control module has a fault, selecting a channel of the second control module by the channel selection module, and sending a second control signal by the second control module to the drive module according to a current motor speed, so as to control the motor to stop working.

With the controlling method according to embodiments of the present disclosure, when the first control module has the fault, the channel selection module selects the channel of the second control module, and then the second control module sends out the second control signal according to the motor speed to control the motor to stop working, which can convert an uncontrollable failure due to the vehicle fault during a high speed driving into controllable failure, thus ensuring that the vehicle stops more smoothly, securely and reliably from the high-speed driving state, and avoiding that the vehicle has an intense forth and back shaking and power components of the vehicle are damaged.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
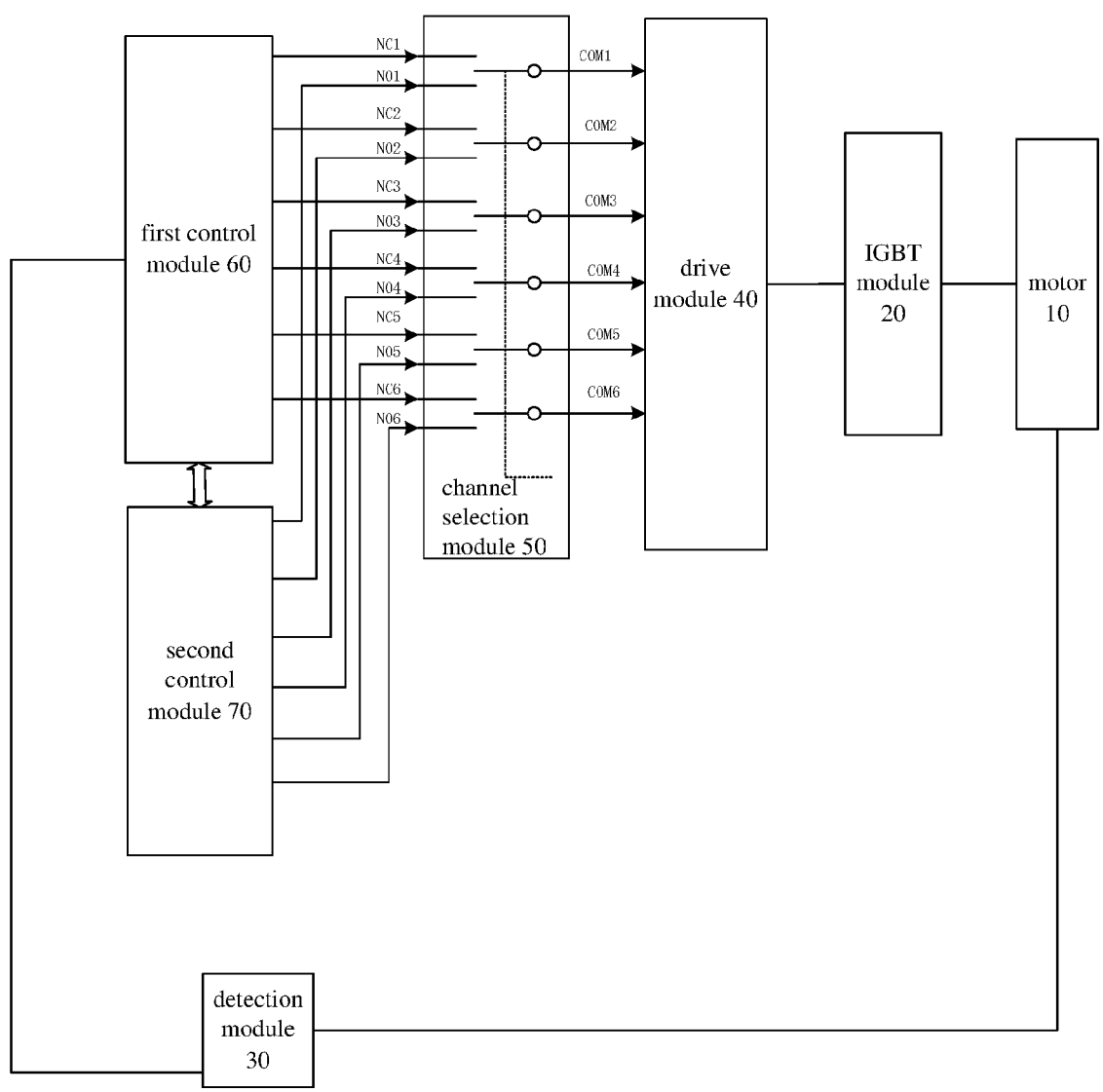
FIG. 1 is a schematic diagram showing a motor control system of an electric vehicle according to a first embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Various embodiments and examples are provided in the following description to implement different structures of the present disclosure. In order to simplify the present disclosure, certain elements and settings will be descried. However, these elements and settings are only by way of example and are not intended to limit the present disclosure. In addition, reference numerals may be repeated in different examples in the present disclosure. This repeating is for the purpose of simplification and clarity, and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may include an embodiment in which an additional feature is formed between the first feature and the second feature so that the first feature does not directly contact the second feature.

Terms concerning attachments, coupling and the like, such as "connected", refer to a relationship in which structures are secured or attached to one another either directly or indirectly through intervening structures, as well as both movable or rigid attachments or relationships, unless expressly described otherwise. Unless specified or limited otherwise, the terms "connected" and variations thereof are used broadly and encompass both direct and indirect mountings, connections, supports, and couplings. Further, "connected" are not restricted to physical or mechanical connections.

The embodiments of the present disclosure will be described in detail hereinafter with reference to the accompanying drawings, in which preferred embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

A motor control system of an electric vehicle and a controlling method for the motor control system according to embodiments of the present disclosure will be described below with reference to drawings.

FIG. 1 is a schematic diagram showing a motor control system of an electric vehicle according to a first embodiment of the present disclosure. Referring to FIG. 1, the motor control system of the electric vehicle includes an IGBT module 20, a detection module 30, a drive module 40, a channel selection module 50, a first control module 60 and a second control module 70.

Figure 2:
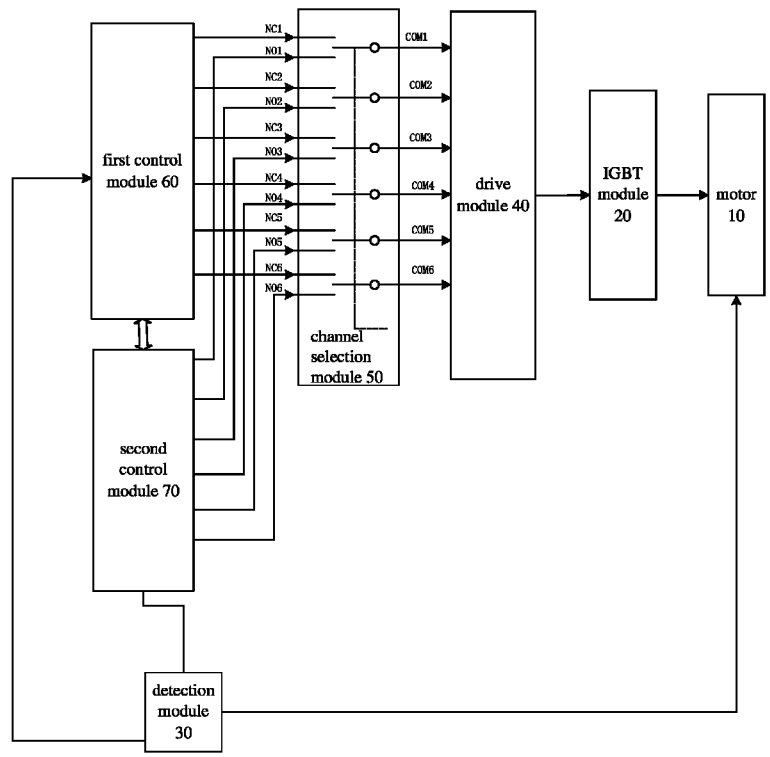
FIG. 2 is a schematic diagram showing a motor control system of an electric vehicle according to a second embodiment of the present disclosure.

The IGBT module 20 is connected with the motor 10 of the electric vehicle. The detection module 30 is connected with the motor 10, and is configured to detect the motor speed. The drive module 40 is connected with the IGBT module 20, and is configured to drive IGBTs in the IGBT module 20 to turn on or off so as to control the motor 10 to work or stop working. The channel selection module 50 is connected with the drive module 40. The first control module 60 is connected with the channel selection module 50 and the detection module 30 respectively. The second control module 70 is connected with the channel selection module 50, and is communicated with the first control module 60. For example, the first control module 60 communicates with the second control module 70 via a CAN (Controller Area Network) or a SCI (Serial Communication Interface). The first control module 60 is configured to send a first control signal to the drive module 40 so as to control the IGBT module 20. When the first control module 60 has a fault, the first control module 60 may generate a fault signal by itself and send the fault signal to the channel selection module 50 and the second control module 70, the channel selection module 50 selects the channel of the second module 70, and the second control module 70 sends a second control signal to the drive module 40 according to the motor speed, so as to control the motor 10 to stop working. In this embodiment, the motor speed is sent from the first control module 60 to the second control module 70, and when the first control module 60 has the fault, the second control module 70 sends the second control signal according to the motor speed sending from the first control module at a predetermined time T1 before the first control module 60 has the fault. The predetermined time T1 generally ranges from 1 s to 3 s. For example, when the first control module 60 has the fault, it sends the motor speed V1 detected at 1.5 s before the fault occurs to the second control module 70, and the second control module 70 sends the second control signal according to V1. In another embodiment of the present disclosure, as shown in FIG. 2, the second control module 70 is connected with the channel selection module 50 and the detection module 30 respectively. When the first control module 60 has the fault and the channel selection module 50 selects the channel of the second control module 70, the second control module 70 sends the second control signal to the drive module 40 according to the current motor speed, so as to control the motor 10 to stop working. The current motor speed is sent from the detection module 30 to the second control module 70 in real-time.

In one embodiment of the present disclosure, the first control module 60 may be a DSP (may be referred to as a main DSP). The main DSP may be a F28M35H52C1 chip which is a 32-bit dual core processor, has a main frequency up to 150 MHZ, and has relatively complete and powerful functions. The second control module 70 may also be a DSP (may be referred to as an auxiliary DSP). The auxiliary DSP may be a MC9S08DZ60 chip which is a 8-bit single core processor, has a main frequency of 40 MHZ and has common functions compared with the main DSP. The channel selection module 50 may be a channel selection chip, for example a TS3A27518E-Q1 chip which is a six-way and two-channel selector.

Figure 3:
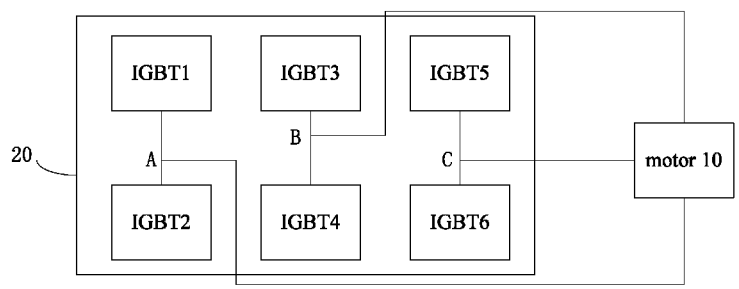
FIG. 3 is a schematic diagram showing an IGBT module connected with a motor according to an embodiment of the present disclosure.

Referring to FIG. 3, the IGBT module 20 may include six IGBTs such as IGBT1, IGBT2, IGBT3, IGBT4, IGBT5 and IGBT6. The six IGBTs form a three-phase bridge. Each two IGBTs are connected with each other and a node is defined between them, so the IGBT module 20 has three nodes such as node A, B and C. These three nodes are connected with a three-phase of the motor 10 respectively. Three IGBTs such as IGBT1, IGBT3 and IGBT5 can be referred to as an upper bridge arm of the three-phase bridge. The other three IGBTs such as IGBT2, IGBT4 and IGBT6 can be referred to as a lower bridge arm of the three-phase bridge. Referring to FIG. 1 and FIG. 2, six outputs of the channel selection module 50 are connected with six terminals COM1, COM2, . . . COM6 of the drive module 40 respectively. Six input ports NC1, NC2, . . . NC6 of the first channel in the channel selection module 50 are connected with the first control module 60, and six input ports NO1, NO2, . . . NO6 of the second channel in the channel selection module 50 are connected with the second control module 70. In normal case, the first control module 60 sends the first control signal (i.e. PWM wave) to the drive module 40 via the six input ports NC1, NC2, . . . NC6 of the first channel to control the six IGBTs in the IGBT module 20 to turn on or off, so as to control the motor 10 to work normally. When the first control module 60 has the fault, the second control signal is sent to the drive module 40 via the six input ports NO1, NO2, . . . NO6 of the second channel of the channel selection module 50.

In one embodiment of the present disclosure, the second control signal includes six signals. The six signals can be six first level signals, six second level signals or three first level signals and three second level signals.

Referring to FIG. 1, when the first control module 60 has the fault and the motor speed is less than or equal to a predetermined speed, the second control module sends six first level signals to turn off each of the six IGBTs in the IGBT module 20. When the first control module 60 has the fault and the motor speed is larger than the predetermined speed, the second control module 70 sends three first level signals and three second level signals to turn on each IGBT in the upper bridge arm or each IGBT in the lower bridge arm. In one embodiment, the first level signal is a high level signal, and the second level signal is a low level signal. In another embodiment, the first level signal is the low level signal, and the second level signal is the high level signal. In other words, in normal case, i.e., when the first control module 60 (i.e. the main DSP) has no fault, the main DSP send six drive signals such as PWM wave to the drive module 40 via the channel selection module 50 such as the channel selection chip, and then the drive module 40 controls the IGBTs in the IGBT module 20 to turn on or off, so as to control the motor 10 to work normally.

When the main DSP has the fault, the second control module such as the auxiliary DSP sends two PWM signals according to the motor speed (i.e. the driving speed of the vehicle) sent from the first control module 60 at the predetermined time before the first control module 60 has the fault, and then each of the two PWM signals are divided into three signals, and finally six PWM signals are sent to the six input ports of the second channel of the channel selection module 50.

In another embodiment of the present disclosure, referring to FIG. 2, the motor speed is also the driving speed of the vehicle, but the motor speed is the current motor speed sent from the detection module 30.

Figure 4:
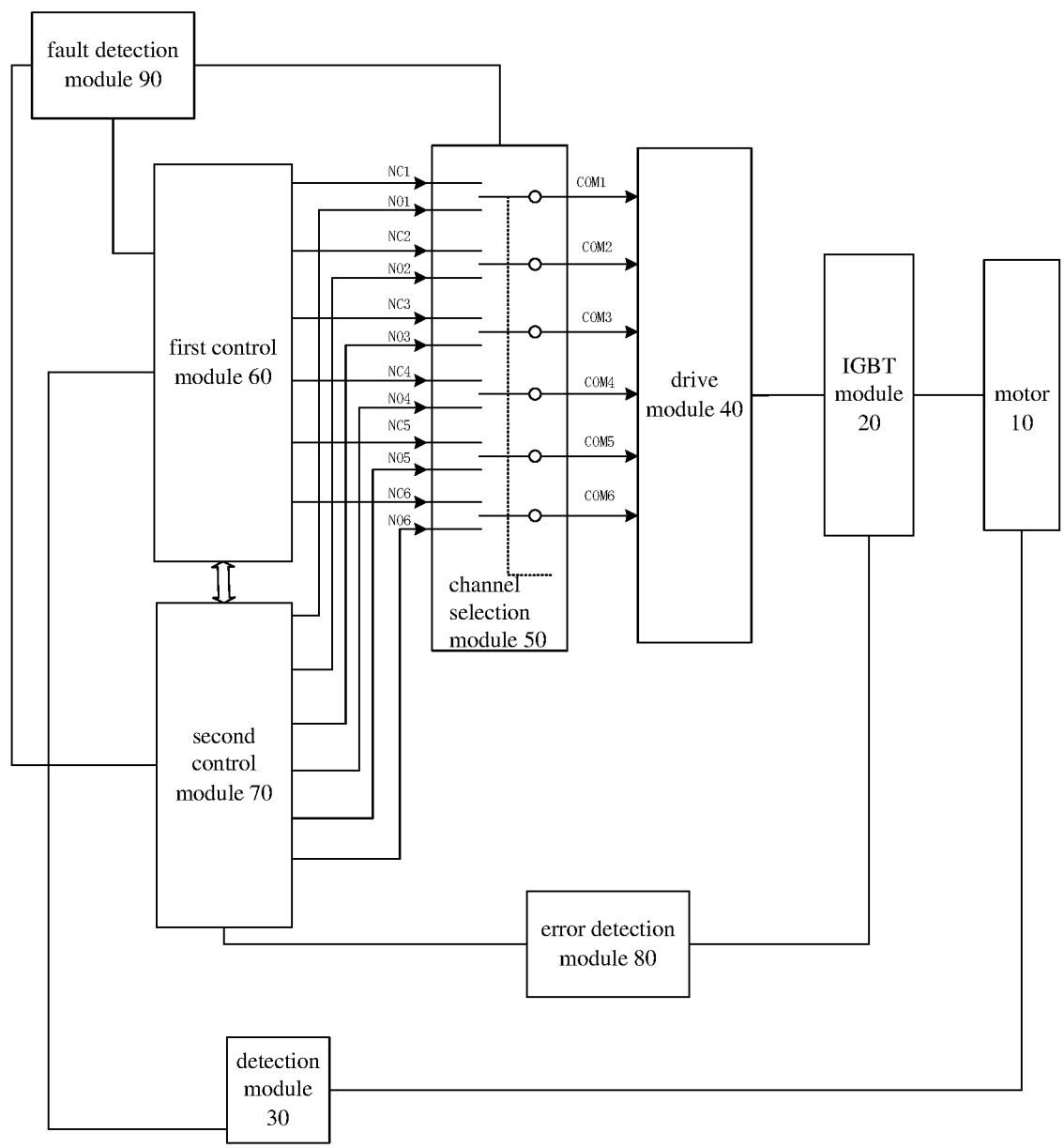
FIG. 4 is a schematic diagram showing a motor control system of an electric vehicle according to a third embodiment of the present disclosure.
Figure 5:
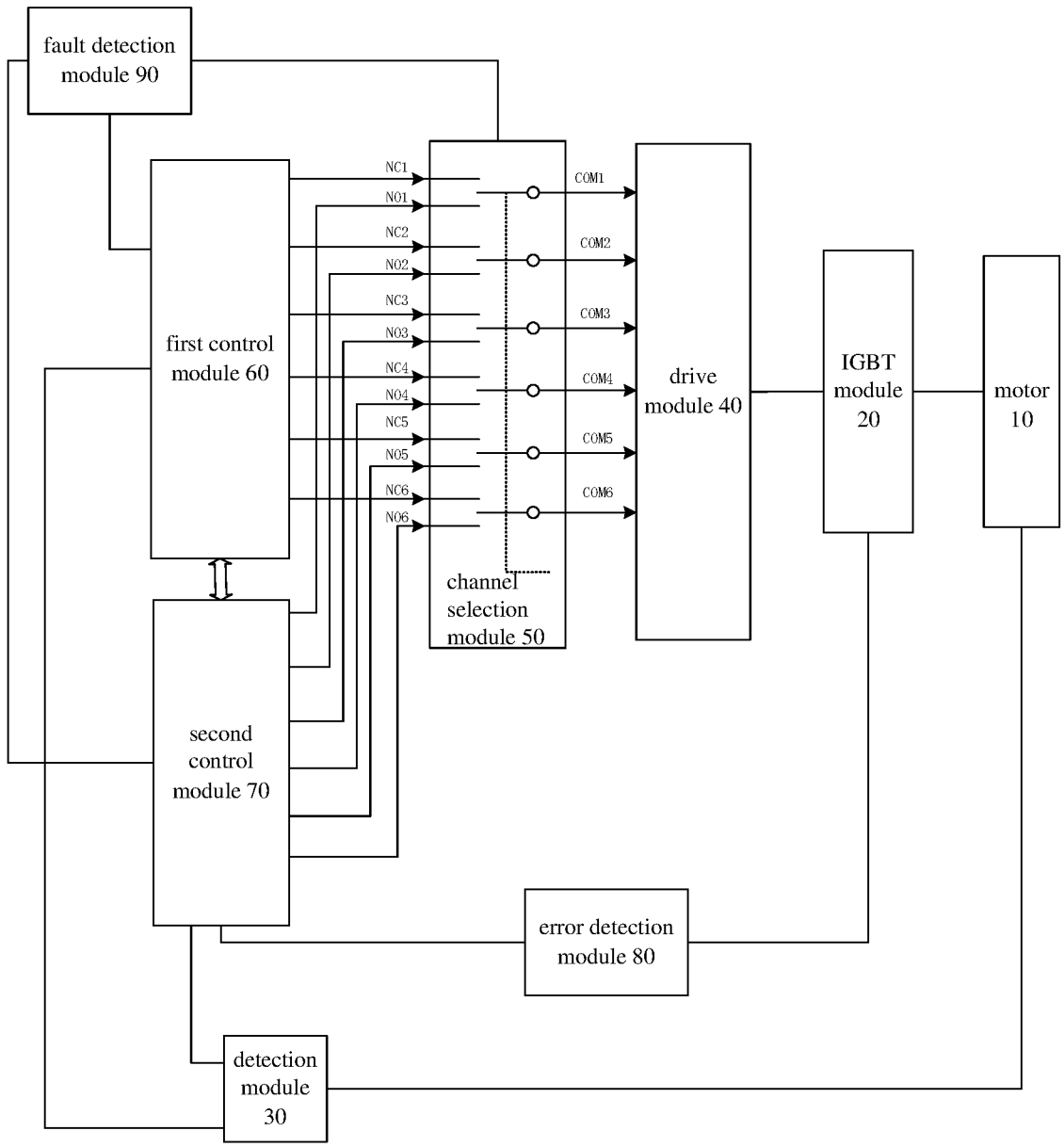
FIG. 5 is a schematic diagram showing a motor control system of an electric vehicle according to a fourth embodiment of the present disclosure.

Referring to FIG. 4 and FIG. 5, the motor control system further includes an error detection module 80. The error detection module 80 is connected with the IGBT module 20 and the second control module 70 respectively, and is configured to determine whether the upper bridge arm and the lower bridge arm have an error information, to generate an error signal according to the determining result, and to send the error signal to the second control module 70. In other words, the error detection module 80 is configured to detect the error information such as over-current and over temperature of the IGBTs, and to send the error signal to the second control module 70 when the error formation is detected, such that the second control module 70 can take corresponding measures to protect the IGBT module 20, thus avoiding the damage to the IGBT module 20.

Further, if the error detection module 80 determines that neither the upper bridge arm nor the lower bridge arm has the error information or only the upper bridge arm has the error information, it may generate a first error signal and send the first error signal to the second control module 70. After receiving the first error signal, the second control module 70 can send three first level signals to turn off each IGBT in the upper bridge arm of IGBT module 20 and send three second level signals to turn on each IGBT in the lower bridge arm of the IGBT module 20. If the error detection module 80 determines that only the lower bridge arm has the error information, it may generate a second error signal and send the second error signal to the second control module 70. After receiving the second error signal, the second control module 70 can send three first level signals to turn off each IGBT in the lower bridge arm of the IGBT module 20 and send three second level signals to turn on each IGBT in the upper bridge arm of the IGBT module 20. If the error detection module 80 determines that both of the upper bridge arm and the lower bridge arm have the error information, it may generate a third error signal and send the third error signal to the second control module 70. After receiving the third error signal, the second control module 70 can send six first level signals to turn off all the IGBTs in the IGBT module 20.

When the first control module 60 has the fault, the first control module 60 can send the fault signal by itself to the second control module 70 and the channel selection module 50, and can also be detected by an additional detection module which sends the fault signal when detecting the fault. Referring to FIG. 4 and FIG. 5, in some embodiments of the present disclosure, the system may further include a fault detection module 90. The fault detection module 90 is connected with the first control module 60, the second control module 70 and the channel selection module 50 respectively, and is configured to determine whether the first control module 60 has the fault, to generate a fault signal when the first control module 60 has the fault, and to send the fault signal to the second control module 70 and the channel selection module 50. Thus, the channel selection module 50 can select the channel of the second control module according to the fault signal.

In one embodiment of the present disclosure, the predetermined motor speed can be 6000 r/min. When the motor speed is less than or equal to the predetermined motor speed, the second control module 70 (i.e. the auxiliary DSP) sends out two PWM waves which are high level signals. In other words, the second control module 70 controls the levels of the six signals output from the second channel of the channel selection module 50 to be high. Once the main DSP has a crash fault at this time, the channel selection module 50 can receive the fault signal sent from the fault detection module 90 and switch to the second channel from the first channel, i.e. transfer the six high level signals of the second channel to the drive module 40 to turn off each IGBT in the IGBT module 20, thus controlling the motor 10 to stop working. When the motor speed is larger than the predetermined motor speed, the auxiliary DSP sends out a two PWM waves according to the error information detected by the error detection module 80, in which one of the PWM waves is the high level signal, the other one is the low level signal. In other words, the second control module 70 controls the second channel of the channel selection module 50 to output three high level signals and three low level signals.

Specifically, according to the different error signals sent from the error detection module 80, the levels of the six signals output from the channel selection module 50 are differently corresponding to the IGBTs in the IGBT module 20 in different cases. When the main DSP occurs the crash fault, the error detection module 80 may determine that neither the upper bridge arm nor the lower bridge arm of the three-phase bridge of the IGBT module 20 has the error information or the upper bridge arm has the error information, and send the first error signal to the auxiliary DSP, the auxiliary DSP can send three first level signals (i.e. high level signals) and three second level signals (i.e. low level signals) to the drive module 40 via the channel selection module 50, such that the drive module 40 can drive each IGBT in the upper bridge arm of the IGBT module 20 to turn off according to the three high level signals and drive each IGBT in the lower bridge arm of the IGBT module 20 to turn on according to the three low level signals. When the main DSP occurs the crash fault, the error detection module 80 may determine that the lower bridge arm of the three-phase bridge has the error information, and send the second error signal to the auxiliary DSP, the auxiliary DSP can send three high level signals and three low level signals to the drive module 40 via the channel selection module 50, such that the drive module 40 can drive each IGBT in the upper bridge arm to turn on according to the three low level signals and drive each IGBT in the lower bridge arm to turn off according to the three high level signals. When the error detection module 80 ay determines that both the lower bridge arm and the upper bridge arm of the three-phase bridge have the error information, it sends the third error signal to the auxiliary DSP, the auxiliary DSP can send six high level signals to the drive module 40 via the channel selection module 50, such that the drive module can control each IGBT in the IGBT module 20 to turn off, so as to control the motor 10 to stop working.

Referring to FIG. 4 and FIG. 5, the system may further include a level conversion module (not shown). The level translation module is connected with the channel selection module 50 and the drive module 40 respectively, and is configured to convert a voltage of a drive signal sent from the channel selection module 50 into the voltage needed by the drive module 40.

With the motor control system of the electric vehicle according to embodiments of the present disclosure, by adding the second control module 70 which is selected by the channel selection module 50 when the first control module 60 has the fault, and sends out different second control signals according to the motor speed to control the motor 10 to stop working, an uncontrollable failure (for example, turning off waves instantaneously) due to the vehicle fault (for example, a crash fault of a DSP, an error of a rotary transformer, an IGBT temperature protection, a motor temperature protection) during a high speed driving can be converted into controllable failure (for example, making the current fully consumed by the motor itself, ensuring that a feedback current is a fixed value within an acceptable range, a feedback torque is small and a braking force is controlled within a few Newton meters), thus ensuring that the vehicle stops more smoothly, securely and reliably from the high-speed driving state, and avoiding that the vehicle has an intense forth and back shaking and power components of the vehicle are damaged.

Figure 6:
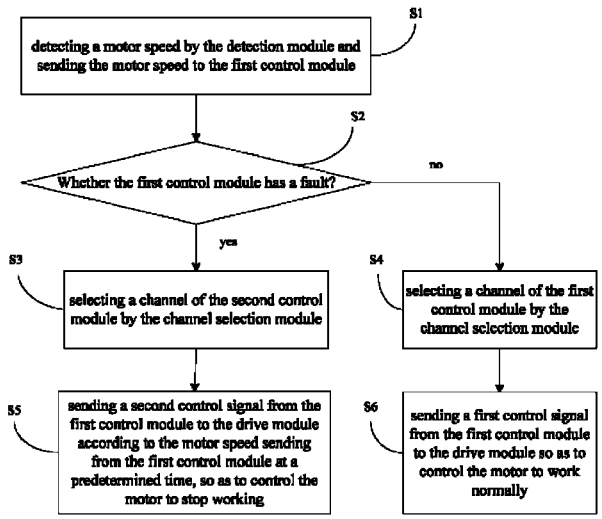
FIG. 6 is a flow chart showing a controlling method for a motor control system of an electric vehicle according to a first embodiment of the present disclosure.

FIG. 6 is a flow chart showing a controlling method for a motor control system of an electric vehicle according to a first embodiment of the present disclosure. The motor control system may include the IGBT module 20, the detection module 30, the drive module 40, the channel selection module 50, the first control module 60 and the second control module 70, and the first control module 60 is communicated with the second control module 70. Referring to FIG. 6, the controlling method for the motor control system of the electric vehicle includes following steps.

At step S1, a motor speed is detected by the detection module 30 and the motor speed is sent to the first control module 60 from the detection module 30.

At step S2, it is determined whether the first control module 60 has the fault, if yes, execute step S3, and if no, execute step S4.

At step S3, a channel of the second control module 70 is selected by the channel selection module and then execute step S5.

At step S4, a channel of the first control module 60 is selected by the channel selection module 50, and then execute step S6.

At step S5, the second control module 70 sends a second control signal to the drive module 40 according to the motor speed sent from the first control module 60 at a predetermined time before the first control module 60 has the fault, so as to control the motor 10 to stop working.

At step S6, the first control module 60 sends a first control signal to the drive module 40 to control IGBTs in the IGBT module 20 to turn on or off, so as to control the motor 10 to work normally.

It should be noted that, step S1 and step S2 can be executed at the same time. When the first control module 60 has no fault, the first control module 60 can send the first control signal (i.e. PWM wave) to the drive module 40 via the channel selection module 50 to control the IGBT module 20 to turn off or turn on, so as to control the motor 10 to work normally. If the first control module 60 has the fault, the channel selection module 50 selects the channel of the second control module 70, i.e. selects the signal in the channel of the second control module 70 to control the motor 10. The second control module 70 sends the second control signal to the drive module 40 according to the motor speed sent from the first control module 60 at the predetermined time T1 before the first control module 10 has the fault, and then the drive module 40 controls the IGBT module 20, so as to control the motor 10 to stop working.

Figure 7:
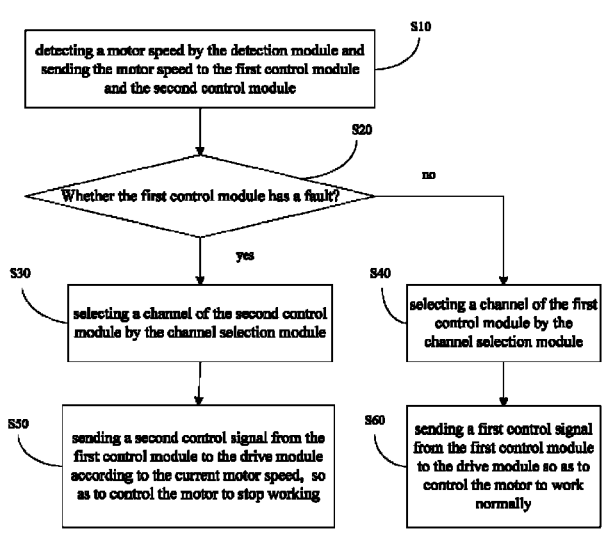
FIG. 7 is a flow chart showing a controlling method for a motor control system of an electric vehicle according to a second embodiment of the present disclosure.

FIG. 7 is a flow chart showing a controlling method for a motor control system of an electric vehicle according to a second embodiment of the present disclosure. Referring to FIG. 7, the controlling method for the motor control system of the electric vehicle may include following steps.

At step S10, a motor speed is detected by the detection module 30 and the motor speed is sent to the first control module 60 and the second control module 70 from the detection module 30.

At step S20, it is determined whether the first control module 60 has the fault, if yes, execute step S30, if no, execute step S40.

At step S30, a channel of the second control module 70 is selected by the channel selection module 50, and then execute step S50.

At step S40, a channel of the first control module 60 is selected by the channel selection module 50, and then execute step S60.

At step S50, the second control module 70 sends a second control signal to the drive module 40 according to the current motor speed, so as to control the motor 10 to stop working.

At step S60, the first control module 60 sends a first control signal to the drive module 40, so as to control the motor 10 to work normally.

It should be noted that, step S10 and step S20 can be executed at the same time. When the first control module 60 has no fault, the first control module 60 can send the first control signal (i.e. PWM wave) to the drive module 40 via the channel selection module 50 to control the IGBT module 20 to turn off or turn on, so as to control the motor 10 to work normally. If the first control module 60 has the fault, the channel selection module 50 selects the channel of the second control module 70, i.e. select the signal in the channel of the second control module 70 to control the motor 10. The second control module 70 sends the second control signal to the drive module 40 according to the current motor speed sent from the detection module 30, and then the drive module controls the IGBT module 20, so as to control the motor 10 to stop working.

Figure 8:
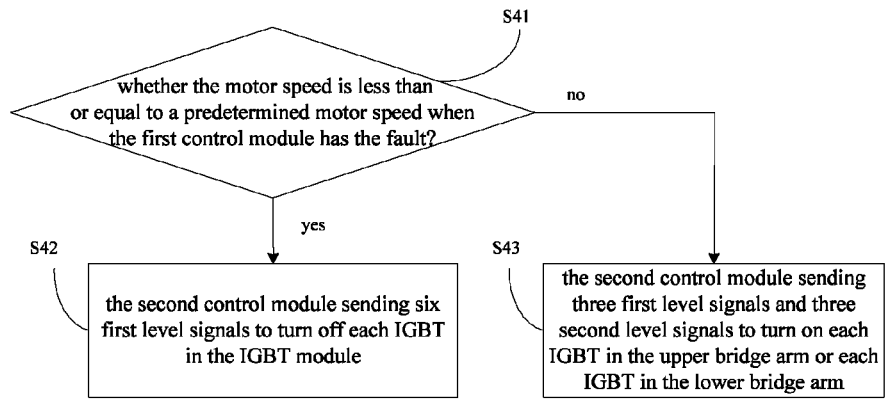
FIG. 8 is a flow chart showing a controlling method for a motor control system of an electric vehicle according to a third embodiment of the present disclosure.

FIG. 8 is a flow chart showing a controlling method for a motor control system of an electric vehicle according to a third embodiment of the present disclosure. The second control signal includes six signals, each of which may be a first level signal or a second level signal. Referring to FIG. 8, step S6 or step S60 may include following steps.

At step S41, it is determined whether the first control module 60 has the fault and whether the motor speed is less than or equal to a predetermined speed, if yes, execute step S42, if no, execute step S43.

At step S42, the second control module 70 sends six first level signals to the drive module 40, and then the drive module 40 drives each IGBT in the IGBT module to turn off.

At step S43, the second control module 70 sends three first level signals and three second level signals to the drive module 40, and then the drive module 40 drive each IGBT in the upper bridge arm to turn on or drive each IGBT in the lower bridge arm to turn on.

Figure 9:
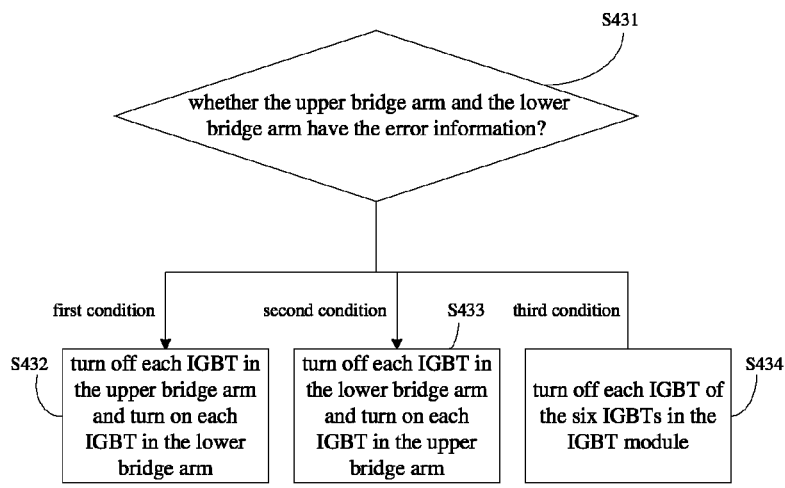
FIG. 9 is a flow chart showing a controlling method for a motor control system of an electric vehicle according to a fourth embodiment of the present disclosure.

Specifically, the three-phase bridge of the IGBT module includes an upper bridge arm and a lower bridge arm, and the system further includes an error detection module. When the motor speed is larger than the predetermined speed, the error information in the upper bridge arm and the lower bridge arm of the three-phase bridge of the IGBT module 20 is detected to generate an error signal, and then the error signal is sent to the second control module 70. The error signal may be a first error signal, a second error signal or a third error signal. FIG. 9 is a flow chart showing a controlling method for a motor control system of an electric vehicle according to a fourth embodiment of the present disclosure. Referring to FIG. 9, step S43 may include following steps.

At step S431, it is determined whether the upper bridge arm and the lower bridge arm of the three-phase bridge of the IGBT module 20 have the error information.

At step S432, if neither the upper bridge arm nor the lower bridge arm has the error information or if the upper bridge arm has the error information, i.e. if a first condition occurs, the first error signal is generated by the error detection module 80 and sent to the second control module 70, and the second control module 70 sends three first level signals and three second level signals according to the first error signal to turn off the upper bridge arm and to turn on the lower bridge arm.

At step S433, if the lower bridge arm has the error information, i.e. a second condition occurs, the second error signal is generated by the error detection module 80 and sent to the second control module 70, and the second control module 70 sends three first level signals and three second level signals according to the second error signal to turn off the lower bridge arm and to turn on the upper bridge arm.

At step S434, if both the upper bridge arm and the lower bridge arm have the error information, i.e. a third condition occurs, the third error signal is generated by the error detection module 80 and sent to the second control module 70, and the second control module 70 sends six first level signals to turn off the each IGBT in the IGBT module 20.

Figure 10:
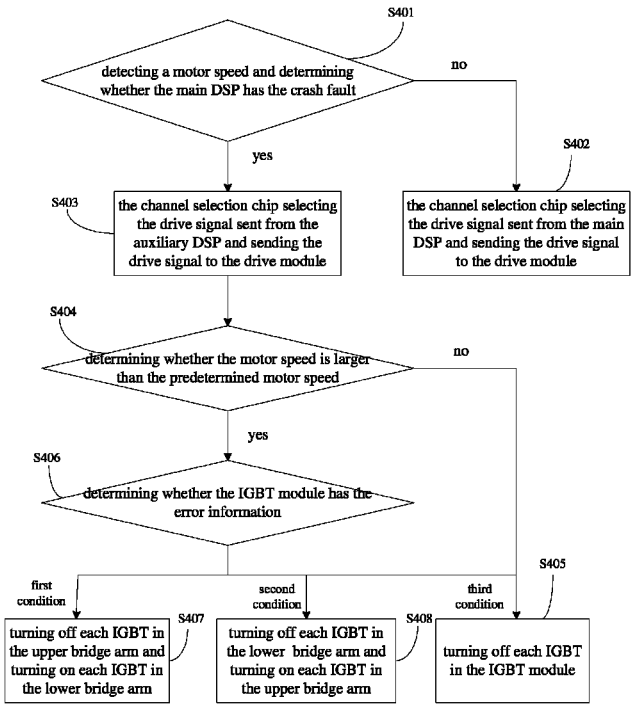
FIG. 10 is a flow chart showing a controlling method for a motor control system of an electric vehicle according to a fifth embodiment of the present disclosure.

FIG. 10 is a flow chart showing a controlling method for a motor control system of an electric vehicle according to a fifth embodiment of the present disclosure. Referring to FIG. 10, the controlling method for the motor control system of the electric vehicle includes following steps.

At step S401, a motor speed is detected and it is determined whether the main DSP has the crash fault, if yes, execute step S403, if no, execute step S402.

At step S402, the channel selection chip selects a drive signal sent from the main DSP and sends the drive signal to the drive module.

Specifically, the main DSP sends the drive signal which is a six-way PWM wave to the drive module via the channel selection chip, and then the drive module controls the IGBT module to turn on or to turn off, so as to control the motor to work normally.

At step S403, the channel selection chip selects the drive signal sent from the auxiliary DSP and sends the drive signal to the drive module 40.

Specifically, the auxiliary DSP sends the drive signal which is a two-way PWM wave and processes this two-way PWM wave according the motor speed, and then the two-way PWM wave are converted into six signals to be sent to the six input ports NO1, NO2, . . . NO6 of the second channel of the channel selection chip respectively.

At step S404, it is determined whether the motor speed is larger than the predetermined speed, if yes, execute step S406, and if no, execute step S405. The motor speed can be the current motor speed sent from the detection module 30, or the motor speed sent from the first control module at the predetermined time T1 before the main DSP has the fault.

At step S405, each IGBT in the IGBT module 20 is turned off according to the drive signal.

Specifically, the predetermined motor speed can be 6000 r/min, when the motor speed is less than or equal to the predetermined motor speed, the auxiliary DSP sends out two PWM waves which are high level signals. In other words, the auxiliary DSP controls the levels of the six signals output from the second channel of the channel selection module to be high. Once the main DSP has the crash fault at this time, the channel selection module can receive the fault signal sent from the fault detection module and switch to the second channel from the first channel, i.e. transfer the six high level signals of the second channel to the drive module to turn off each IGBT in the IGBT module, thus controlling the motor to stop working.

At step S406, it is determined whether the IGBT module has the error information, i.e. it is determined whether the upper bridge and the lower bridge arm of the IGBT module have the error information.

In other words, when the motor speed is larger than 6000 r/min, the auxiliary DSP sends out two PWM waves according to the error information detected by the error detection module. When neither the upper bridge arm nor the lower bridge arm has the error information or when the upper bridge arm has the error information, i.e. when the first condition occurs, execute step S407; when the lower bridge arm has the error information, i.e. when the second condition occurs, execute step S408; when both the upper bridge arm and the lower bridge arm of the IGBT module have the error information, i.e. when the third condition occurs, execute step S405.

At step S407, each IGBT in the lower bridge arm of the IGBT module is turned off.

Specifically, when the main DSP has the crash fault, and the IGBT module has no error information or only the upper bridge arm has the error information, the auxiliary DSP sends the high level signal to the upper bridge arm of the IGBT module 20 and sends the low level signal to the lower bridge arm of the IGBT module 20. Specifically, the auxiliary DSP sends the high level signal and the low level signal to the drive module via the channel selection chip to turn off the upper bridge arm of the IGBT module 20 and to turn on the lower bridge arm of the IGBT module 20, so as to control the electric vehicle to stop working smoothly and steadily.

At step S408, each IGBT in the upper bridge arm of the IGBT module 20 is turned on.

Specifically, when the main DSP has the crash fault, and the lower bridge arm has the error information, the auxiliary DSP sends the high level signal to the lower bridge arm of the IGBT module 20 and the low level signal to the upper bridge arm of the IGBT module 20. Specifically, the auxiliary DSP sends the high level signal and the low level signal to the drive module 40 via the channel selection chip to turn off the lower bridge arm of the IGBT module 20 and to turn on the upper bridge arm of the IGBT module 20, so as to control the electric vehicle to stop working smoothly and steadily.

With the controlling method for the motor control system of the electric vehicle according to embodiments of the present disclosure, by adding the second control module 70 which is selected by the channel selection module 50 when the first control module 60 has the fault, and sends out different second control signals according to the motor speed to control the motor 10 to stop working, an uncontrollable failure (for example, turning off waves instantaneously) due to the vehicle fault (for example, a crash fault of a DSP, an error of a rotary transformer, an IGBT temperature protection, a motor temperature protection) during a high speed driving can be converted into controllable failure (for example, making the current fully consumed by the motor itself, ensuring that a feedback current is a fixed value within an acceptable range, a feedback torque is small and a braking force is controlled within a few Newton meters), thus ensuring that the vehicle stops more smoothly, securely and reliably from the high-speed driving state, and avoiding that the vehicle has an intense forth and back shaking and power components of the vehicle are damaged.

Figure 11:
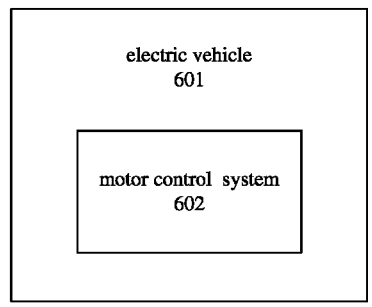
FIG. 11 is a schematic diagram showing an electric vehicle according to an embodiment of the present disclosure.

The present disclosure also provides an electric vehicle 601. FIG. 11 is a schematic diagram showing an electric vehicle according to an embodiment of the present disclosure. Referring to FIG. 11, the electric vehicle 601 includes the aforementioned motor control system 602.

With the electric vehicle according to embodiments of the present disclosure, an uncontrollable failure (for example, turning off waves instantaneously) due to the vehicle fault (for example, a crash fault of a DSP, an error of a rotary transformer, an IGBT temperature protection, a motor temperature protection) during a high speed driving can be converted into controllable failure (for example, making the current fully consumed by the motor itself, ensuring that a feedback current is a fixed value within an acceptable range, a feedback torque is small and a braking force is controlled within a few Newton meters), thus ensuring that the vehicle stops more smoothly, securely and reliably from the high-speed driving state, and avoiding that the vehicle has an intense forth and back shaking and power components of the vehicle are damaged.

It will be understood that, the flow chart or any process or method described herein in other manners may represent a module, segment, or portion of code that includes one or more executable instructions to implement the specified logic function(s) or that includes one or more executable instructions of the steps of the progress. Although the flow chart shows a specific order of execution, it is understood that order of execution may differ from that which is depicted. For example, the order of execution of two or more boxes may be scrambled relative to the order shown. Also, two or more boxes shown in succession in the flow chart may be executed concurrently or with particular concurrence. In addition, any number of counters, state variables, warning semaphores, or messages might be added to the logical flow described herein, for purpose of enhanced utility, accounting, performance measurement, or providing troubleshooting aids, etc. It is understood that all such variations are within the scope of the present disclosure. Also, the flow chart is relatively self-explanatory and is understood by those skilled in the art to the extent that software and/or hardware can be created by one with ordinary skill in the art to carry out the various logical functions as described herein.

The logic and step described in the flow chart or in other manners, for example, a scheduling list of an executable instruction to implement the specified logic function(s), it can be embodied in any computer-readable medium for use by or in connection with an instruction execution system such as, for example, a processor in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, communicate, propagate, or transport the program for the instruction execution system, apparatus, device, or the device for use by in connection with the instruction execution system, apparatus, device. The computer readable medium can include any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device. Further, the computer-readable medium could even be paper or another suitable medium upon which the program is printed, for example, by the paper or other medium for optical scanning, and then edit, interpretation or in other suitable way for processing when necessary to obtain the program, and then stored in a computer memory.

Although the device, system, and method of the present disclosure is embodied in software or code executed by general purpose hardware as discussed above, as an alternative the device, system, and method may also be embodied in dedicated hardware or a combination of software/general purpose hardware and dedicated hardware. If embodied in dedicated hardware, the device or system can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc.

Such technologies are generally well known by those skilled in the art and consequently, are not described in detail herein. It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but not limited to read-only memories magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A motor control system of an electric vehicle, comprising:
    an IGBT module, configured to be connected with a motor of the electric vehicle;
    a detection module, configured to be connected with the motor, and configured to detect a motor speed;
    a drive module, connected with the IGBT module, and configured to drive IGBTs in the IGBT module to turn on or off so as to control the motor to work or stop working;
    a first control module, connected with the detection module;
    a second control module, communicated with the first control module;
    a channel selection module, connected with the drive module, the first control module and the second control module respectively, and configured to select a channel of the first control module or the second control module; and
    an error detection module, connected with the IGBT module and the second control module respectively, and configured to determine whether an upper bridge arm and a lower bridge arm have an error information, to generate a first error signal if neither the upper bridge arm nor the lower bridge arm has the error information or if the upper bridge arm has the error information, to generate a second error signal if the lower bridge arm has the error information, and to generate a third error signal if each of the upper bridge arm and the lower bridge arm has the error information;
    wherein when the first control module has a fault, the channel selection module selects the channel of the second control module;
    when the channel selection module selects the channel of the first control module, the first control module sends a first control signal to the drive module so as to control the drive module to drive the IGBTs in IGBT module to turn on or off;

when the channel selection module selects the channel of the second control module, the second control module sends a second control signal to the drive module according to the motor speed, so as to control the motor to stop working, wherein the motor speed is the motor speed at a predetermined time before the first control module has the fault or the current motor speed; and wherein the second control module is further configured to send three first level signals to turn off each IGBT in the upper bridge arm and send three second level signals to turn on each IGBT in the lower bridge arm according to the first error signal, to send three second level signals to turn on each IGBT in the upper bridge arm and three first level signals to turn off each IGBT in the lower bridge arm according to the second error signal, and to send six first level signals according to the third error signal to turn off each IGBT in the IGBT module.

2. The system of claim 1, wherein the second control signal comprises six signals, and the IGBT module comprises six IGBTs consisting a three-phase bridge, in which the three-phase bridge comprises the upper bridge arm and the lower bridge arm.

3. The system of claim 2, wherein
when the first control module has the fault and the motor speed at a predetermined time before a time when the first control module has the fault is less than or equal to a predetermined speed, the second control module sends six first level signals to turn off each of the six IGBTs in the IGBT module; and when the first control module has the fault and the motor speed at a predetermined time before a time when the first control module has the fault is larger than the predetermined speed, the second control module sends three first level signals and three second level signals to turn on each IGBT in the upper bridge arm or each IGBT in the lower bridge arm.

4. The system of claim 1, further comprising:
a fault detection module, connected with the first control module, the second control module and the channel selection module respectively, and configured to determine whether the first control module has the fault, to generate a fault signal when the first control module has the fault, and to send the fault signal to the second control module and the channel selection module respectively.

5. An electric vehicle, comprising a motor control system of claim 1.

6. A controlling method for a motor control system of an electric vehicle, wherein the motor control system comprises an IGBT module, a detection module configured to be connected with a motor of the electric vehicle, a drive module connected with the IGBT module, a channel selection module connected with the drive module, a first control module connected with the detection module and the channel selection module respectively, and a second control module connected with the channel connection module and communicated with the first control module, and the controlling method comprises:

detecting a motor speed by the detection module and sending the motor speed to the first control module;
determining whether the first control module has a fault;
when the first control module does not have a fault, selecting a channel of the first control module by the channel selection module, and sending a first control signal by the first control module to control the drive module to drive IGBTs in the IGBT module to turn on or off; and
when the first control module has a fault, selecting a channel of the second control module by the channel selection module, and sending a second control signal by the second control module according to the motor speed so as to control the motor to stop working, wherein the motor speed is the motor speed at a predetermined time before the first control module has the fault or the current motor speed;
determining whether an upper bridge arm and a lower bridge arm have an error information;
generating a first error signal if neither the upper bridge arm nor the lower bridge arm has the error information or if the upper bridge arm has the error information, and sending three first level signals to turn off each IGBT in the upper bridge arm and sending three second level signals to turn on each IGBT the lower bridge arm by the second control module according to the first error signal;
generating a second error signal if the lower bridge arm has the error information, and sending three second level signals to turn on each IGBT in the upper bridge arm and sending three first level signals to turn off each IGBT in the lower bridge arm by the second control module according to the second error signal; and
generating a third error signal if each of the upper bridge arm and the lower bridge arm has the error information, and sending six first level signals by the second control module according to the third error signal to turn off each IGBT in the IGBT module.

7. The method of claim 6, wherein the second control signal comprises six signals, and the IGBT module comprises six IGBTs consisting a three-phase bridge, in which the three-phase bridge comprises the upper bridge arm and the lower bridge arm.

8. The method of claim 7, wherein sending a second control signal by the second control module according to the motor speed at a predetermined time before the first control module has the fault so as to control the motor to stop working comprises:
when the first control module has the fault and the motor speed at a predetermined time before a time when the first control module has the fault is less than or equal to a predetermined speed, sending six first level signals by the second control module to turn off each of the six IGBTs in the IGBT module; and
when the first control module has the fault and the motor speed at a predetermined time before a time when the first control module has the fault is larger than the predetermined speed, sending three first level signals and three second level signals by the second control module to turn on each IGBT in the upper bridge arm or each IGBT in the lower bridge arm.

* * * * *